Nov. 5, 1929.  B. E. ELDRED  1,734,248
PHOTOPHONOGRAPHIC APPARATUS AND METHOD
Filed May 28, 1924  2 Sheets-Sheet 2
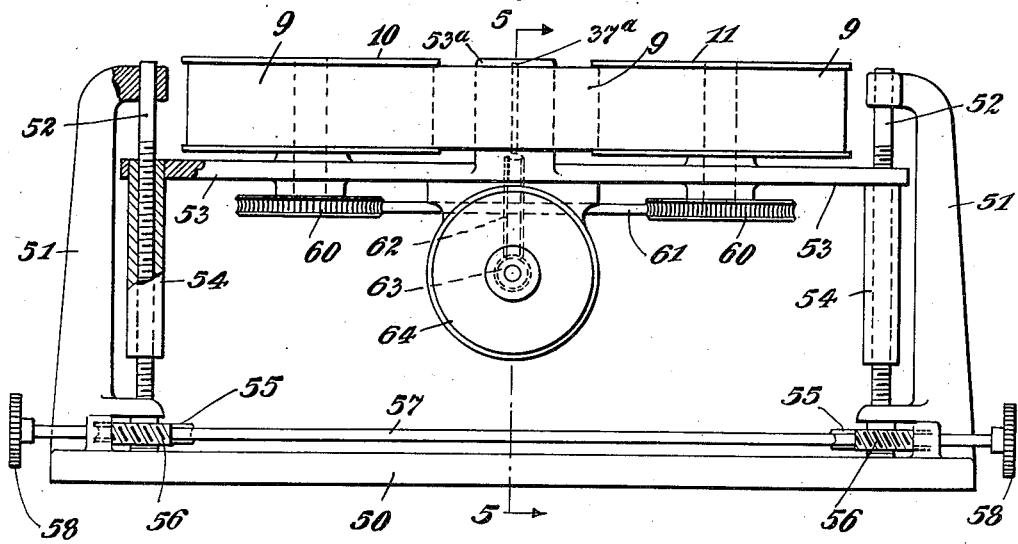
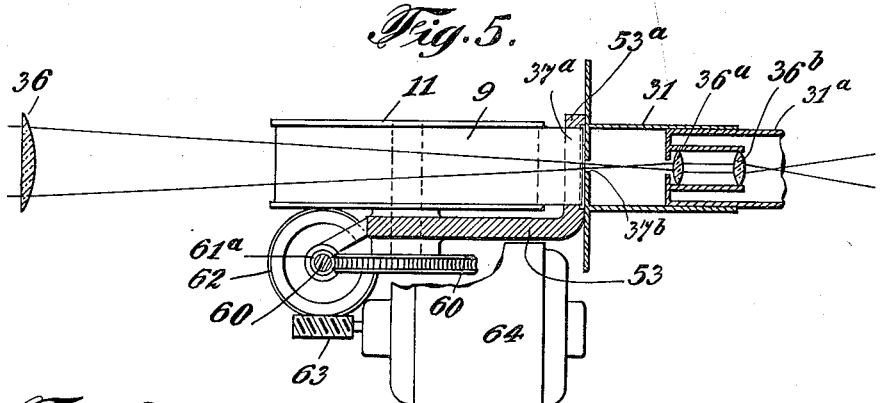
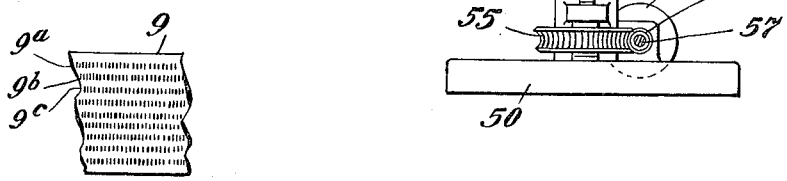
INVENTOR
Byron E. Eldred
BY
George C. Dean ATTORNEY Patented Nov. 5, 1929

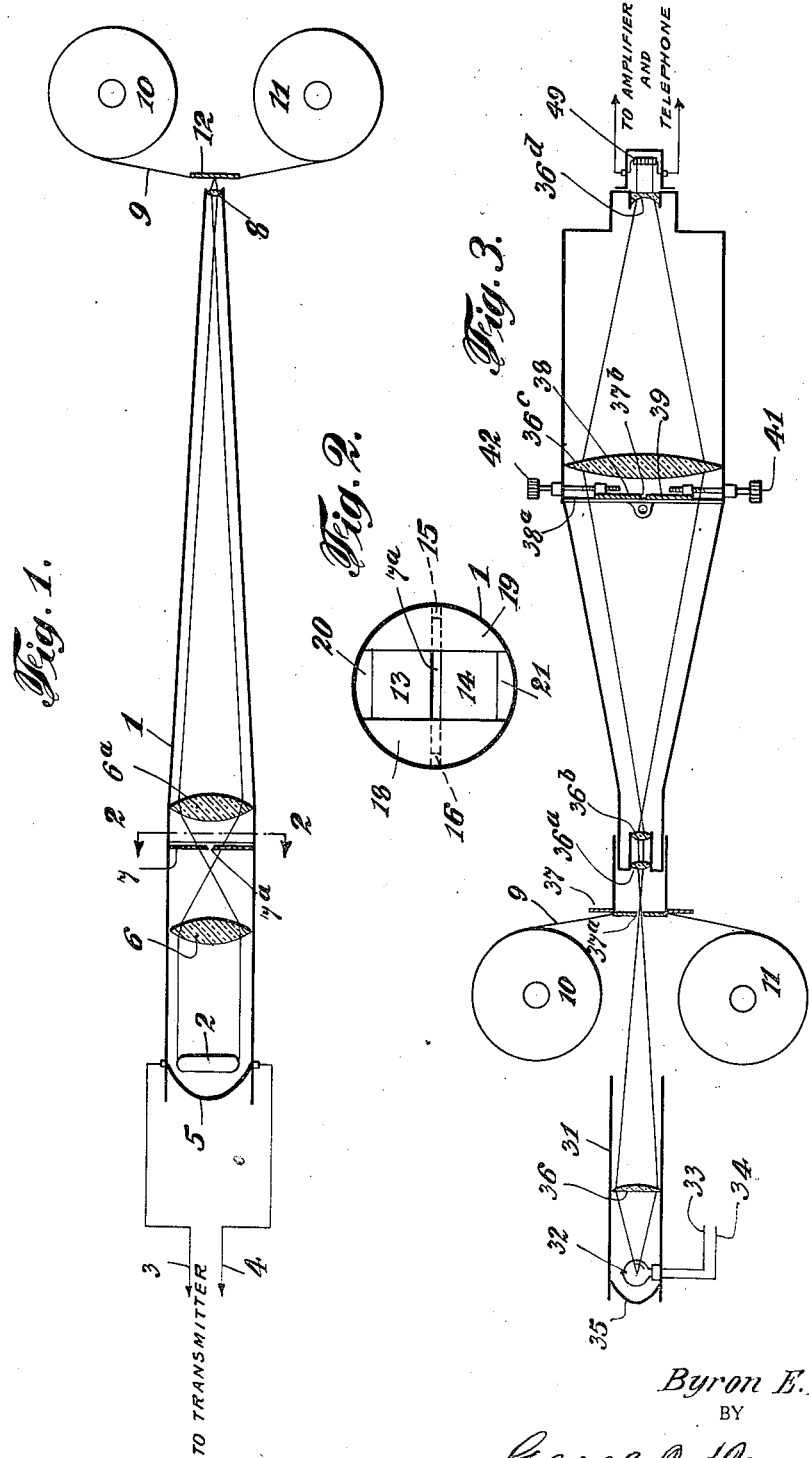

1,734,248

UNITED STATES PATENT OFFICE

BYRON E. ELDRED, OF GREAT NECK, NEW YORK, ASSIGNOR TO RCA PHOTOPHONE, INC., A CORPORATION OF DELAWARE

PHOTOPHONOGRAPHIC APPARATUS AND METHOD

Application filed May 28, 1924. Serial No. 716,296.

My present invention includes recording of sound by employing a source of light varied by and in accordance with the sound variations and a photographic film on which said variations are recorded, and reproducing by means of a beam of light varied by and in accordance with the film record and projected upon a selenium or other light sensitive cell the variations of which are translated into sound through an audio frequency amplifier and a telephone receiver which may be either the ordinary head type or the loud speaking type. The elements so far as named above may be any of those already well known in the art.

My invention depends upon the fact that the present-day audio frequency amplifiers as used in radio receiving sets are so sensitive that the energy variations of the light beam projected on the light sensitive cell may be decreased to an extraordinary extent, while yet remaining strong enough for satisfactory amplification and reproduction.

This, in turn, makes it possible to utilize an extremely minute record on the photograph film. One ultimate object of my invention, and an important one, is to make the records so minute that a very long conversation and even the contents of a whole book may be recorded on a relatively small film surface.

One important difficulty in this connection has been the necessity of running the film at relatively high speed and spreading out the sound record over a long distance, in order that the light variations may not overlap and obscure or obliterate each other as to their printing effect on the film. The practical limitation seems to be determined by the permissible narrowness of the slit or "pin hole" through which the recording beam is projected on the film. Apparently a slit even as wide as 1/1000 of an inch is difficult to make, and tends to produce undesirable defraction of the light so that the slit must be very close to the film in order to prevent a spreading or halation phenomena whereby the scattered light produces the effect of a substantially wider slit but with proportionally decreased intensity. Theoretically, it would seem that in order to properly record the higher speech frequencies, up to say 5,000 per second, a slit having an effective width of 1/1000 of an inch would have to be used on a film traveling several thousandths of an inch, preferably four to eight thousandths in 1/5000 of a second or, say, 5×5000×60 equals 1500 inches equals 125 feet per minute. It would seem that in actual present-day practice reaching a speed as low as 50 or 60 feet per minute is difficult even when the desirable high frequencies are sacrificed down to, say, 2000 or 1500 or below.

My present invention contemplates the use of a slot of physical width which is easily attainable and whereby the defraction of light at the edge of the slot is a very small percentage of the thickness of the beam projected therethrough. The image of the slot, i. e., the cross-section of the beam projected therethrough is then reduced by a reversed microscope or other suitable reducing-camera means to any desired minute size. The light being proportionally intensified, may be stopped down by screens or diaphragms at any desired point along the path of the divergent or convergent beams in the microscope. The accuracy of the slot may be perfected and verified by using a projector as a microscope and testing the trueness of the magnified image projected therethrough. If true for magnification, it must be true for reduction even though it be difficult to verify the latter fact by direct observation.

A true or sharply focused, real image of the slot as fine as desirable, being thus attainable and the intensity thereof being reducible to any desired extent, it is obvious that the speed of the film may be reduced to an extraordinary extent and the printing thereon may be extraordinarily faint. This is of course because unbelievably minute energy variations can be stepped up to useful amplitude by means of audio frequency amplifiers.

While the minuteness of record thus attainable is very important for my purpose in using the contents of a large book on a relatively small film, it will be evident that my method possesses a further advantage as concerns photophonographic films for all purposes, since it solves the above limitation of film speed with respect to slot width as bearing on high frequencies which will be reproduced. For instance, in the case of moving talking picture films, the speed of which is practically fixed by the commercially desirable speeds for moving pictures, the sound records that are printed on the margin of the moving picture film can be made perfectly clear for much higher frequencies than is now possible, and for other films where the speed is not thus limited, it is perfectly possible to secure perfect records of sound variations up to and even beyond the limit of audibility.

The above and other features of my invention may be more fully understood from the following description in connection with the accompanying drawings, in which Fig. 1 is a diagrammatic view of the recorder and Fig. 3 of a reproducer made in accordance with my invention;

Fig. 2 is a section on the line 2—2, Fig. 1;

Fig. 4 is a side elevation of a film reel carrier that may be used for the film for either the recorder or the reproducer;

Fig. 5 is a section on the line 5—5, Fig. 4; and

Fig. 6 is a detail view diagrammatically illustrating a photographic record of the sound in accordance with my present invention.

Referring to Fig. 1, the recording projector and reversed microscope may have an enclosing tube 1, containing a lamp 2, which may be any lamp of the type now well known in the art as capable of varying its radiation by and in accordance with sound variations. The sound variations and the keep alive current may be supplied from any suitable transmitting apparatus through the wires 3, 4. In the rear of the lamp 2 the casing 1 may be closed in by a reflector 5. The light, either direct or reflected, is centered by a lens 6, which in this case is shown as double convex. Beyond the focus where the converging rays cross and in a plane where a reduced image of the lamp will be formed, I arrange the slotted diaphragm 7 which cuts out as much of the image and light from lamp 2 as may be desired. The light which passes through the slot is further concentrated by the reducing lens 6$^a$ and a final reducing lens 8. The film 9, supplied from and moved by reels 10, 11, is guided in a predetermined plane by suitable support 12. The plane of the face of the film may be as near as desired to the focal or crossing point of the rays from lens 8, but preferably in a plane where a real image of the slot is formed.

It will be noted that I have not attempted to follow the divergence, convergence and crossing points of the light through the slot 7$^a$ of diaphragm 7, but have taken the extreme lines of the image of the lamp as indicating the cones and focuses characteristic of said image.

It will be evident that the nearer the receiving surface of film 9 is to the focus of lens 8, the more microscopic will be the width of the slot image operating thereon and the light will be proportionally concentrated. Consequently, it may be desirable to utilize the well known expedient of screens for absorbing all of the heat rays in the beam and the light may of course be stopped down by diaphragms to any desired extent. Apparently the limit of thinness for the image of the slot and the correlative slowness of possible travel of the film 9 will be determined by how accurately the sensitive face of the film can be made to travel in a true fixed plane, to and past the line of impingement of the light.

While my invention permits the use of a slot large enough to avoid mechanical difficulties in its production, one arangement usable for this purpose is diagrammatically indicated in Fig. 2. Here the diaphragm comprises circular screens 13, 14, which are semi-circles except for the slot space 7$^a$ between them. Spacers 15, 16 of any desired thickness may be employed, against which the screens may be forced to insure proper spacing and parallelism of the slot edges. The slot may be stopped down if desired by segmental pieces 18, 19, which may be also positioned by spacers 20, 21.

As indicated in Fig. 6, the lines recorded on the film at 9$^a$, 9$^b$, 9$^c$, etc., may be very narrow and the records consist of transversely parallel graduations of shading. There may be many parallel lines of record, the number and closeness of their spacing being limited by practical considerations an important one of which would seem to be the minimum width of space that is necessary to insure that one record will not encroach upon the other in recording and to insure that in the reproducing the images of all but one line of record will be cut out. As the films are liable to a certain amount of contraction, expansion and distortion in the development and by varying temperatures and moistures when in use, this may prove an important limitation.

The reproducer is diagrammatically indicated as comprising a tube 31, having at one end a source of light in the form of a lamp 32, supplied through conductors 33, 34. A reflector 35, which may be parabolic, is shown as closing the rear end of the tube. The direct and reflected light is concentrated by a condensing lens 36 and passes through a transverse slot 37$^a$ in film support 37 and then through the developed film 9, supplied by reels 10, 11, the intensities of which are varied by the record printed on the film. The part of the beam showing a portion of one of the parallel records 9$^a$ or 9$^b$, etc., shines through slot 37$^b$ (Fig. 5); then through double convex lenses 36ª, 36ᵇ, whereby a greatly magnified image of this small portion of the record is projected at the plane of diaphragm 47. This diaphragm is a crossed slot arrangement on the principle of Fig. 2, except that the elements are adjustable so that any desired minute portion of the image of the film may be permitted to pass, the remainder of the magnified image being stopped out. The slot 37ᵇ parallel with 37ª is formed between the adjacent edges of slide plates 38, 39, which may be adjusted from the outside by screws 41, 42. The crossing slot that limits the image to one record is formed by slide 38ª, like 38, and a corresponding slide not shown, both adjustable by screws line 41, 42.

The thus selected minute transverse element of one film record may be passed through a lens 36ᶜ which will be selected and adjusted with a view to applying the light to the surface of a lens 36ᵈ. These two lenses, 36ᶜ and 36ᵈ, will be selected so as to apply a real image of the selected portion of the record by a parallel ray beam to the sensitive surface of a selenium cell diagrammatically indicated at 49. Current from a suitable source, flowing through this cell will be varied by and in accordance with the varying intensitites of the successive light beams projected thereon, and these variations will be utilized in any of the well known audio frequency amplifiers and loud speakers which, though a necessary part of my complete apparatus are well known inventions of others.

It will be evident that the showing of lenses is purely diagrammatic, both as to number, curvature and in location, it being understood that any known or desired arrangement of reducing lenses for the recorder and magnifying projectors for the reproducer may be employed. The usual or similar lens arrangement used with the so-called ultra microscope is suggested as especially desirable for the practice of my invention. It is to be noted, however, that in all of the figures the relatively great distances between lenses are intended as permitting small angle convergences and divergences in the approach of the light beam to the sensitive film for printing and to the selenium cell for reproducing. Such small angles permit of more accurate optical definition of the beam, thereby decreasing liability of stray light reaching either of these sensitive points in the apparatus.

It will be evident that the inner surface on all this part of the apparatus may be darkened after the manner of optical instruments, and preferably they will be sealed with every precaution for excluding any trace of dust or other disturbing medium, both initially and in use.

Any desired means may be employed for mounting and moving the film and records thereon in opposite relation to the reproducer. A simple form of mechanism for this purpose is shown in Figs. 4 and 5, as comprising a base 50 with brackets 51 having screws 52 journaled therein on which carriage 53 is adjustably mounted by means of screw threaded extensions 54. Mounted on 53 is the element 53ª, in which is formed the above described slot 37ª, which extends transversely of the film 9. The reels 10, 11, whereby the film 9 is carried, are rotatably mounted on carriage 53 and are driven by worm wheels 60 engaged by worms 61ª on shaft 61 which is driven by worm wheel 62 engaged by worm 63 on the armature shaft of rotary electric motor 64. The worm wheels 60, 60 of the reels are intended to be driven alternately to draw the film from the other reel which will then be serving as a supply reel. Any well known mechanism may be employed for engagement and disengagement and for applying suitable drag upon the supply reel.

The carriage 53 with the supply reels thereon is vertically adjustable to bring the lines of the record, one at a time, in line with the magnifying projector apparatus, by means of worm wheels 55 each rotated in the same direction by worms 56 on shaft 57, the rotation of which may be controlled in any desired way as, for instance, by hand wheels 58.

It will be evident that the above described means for reeling the film lengthwise and for transverse translation thereof makes it most convenient to record in strips alternately in opposite directions, as the film is reeled first one way and then the other, but it will be evident that films may be used in endless band form, or the recording may be in circles or in spirals, as is common in the case of disc records for ordinary phonographs; also that transparencies other than films may be used.

It will be evident to those skilled in the art that my above described apparatus and method of recording through what amounts to a photographic reducing camera is a great improvement in the art. Furthermore, it is radically new to employ an image of the record projected through what amounts to an enlarging camera whereby a sharply focused, real image on the surface of the selenium cell is produced. This makes it possible to use a selected portion of the image, as sharply focused and as narrow as may be desired while at the same time having the narrow band or element cover as much of the surface of the selenium or other light sensitive cell, that may be desired. Provided the resistance changes of the cell have the sharp definition attainable by my method, the resistance changes, though phenomenally faint as to quantity, can be caused to produce by audio amplification, reproductions as loud as may be desired and clearer and freer from distortion and with the overtone preserved, all in a degree surpassing anything heretofore attained by any phonographic method. Conversely, records of entirely satisfactory quality can be produced in microscopic size, preferably for the purpose and with the result that very long records, even a whole book, may be reproduced by records of relatively small size.

I claim:

Apparatus for photophonographic reproduction of sound from a photographic record thereof, including means whereby light is concentrated on a selected portion of the record, enlarging camera means for forming a moving real image of the moving illuminated record, apertured diaphragm means whereby a selected portion of said moving image is allowed to pass and the remainder screened out, further camera means whereby said selected portion of said real image of the record is projected on a light sensitive electrical resistance, an electric circuit carrying current varied by said resistance, means for amplifying said variations and translating the same into sound waves.

Signed at New York city, in the county of New York and State of New York, this 27th day of May, A. D. 1924.

BYRON E. ELDRED.